United States Patent [19]

Noggle et al.

[11] Patent Number: 4,662,254
[45] Date of Patent: May 5, 1987

[54] QUICK CHANGE TOOL BLOCK CLAMP

[75] Inventors: Kenneth G. Noggle, West Bloomfield; Lee Reiterman, Royal Oak, both of Mich.

[73] Assignee: GTE Valeron Corporation, Troy, Mich.

[21] Appl. No.: 806,951

[22] Filed: Dec. 9, 1985

[51] Int. Cl.⁴ .............................................. B23B 29/08
[52] U.S. Cl. ................................... 82/36 B; 407/101; 408/197
[58] Field of Search ............... 82/36 B, 36 A, 36 R, 82/37; 407/101, 111, 46; 408/185, 197

[56] References Cited

U.S. PATENT DOCUMENTS

| | | | |
|---|---|---|---|
| 3,354,761 | 11/1967 | Sadier | 82/36 A |
| 3,371,394 | 3/1968 | Dupuis | 407/101 |
| 3,555,943 | 1/1971 | Papp | 82/37 |
| 4,329,091 | 5/1982 | Erkfritz | 407/111 |

FOREIGN PATENT DOCUMENTS

| | | | |
|---|---|---|---|
| 197807 | 7/1978 | Fed. Rep. of Germany | 82/36 B |
| 204637 | 12/1983 | Fed. Rep. of Germany | 82/36 B |

*Primary Examiner*—Leonidas Vlachos
*Attorney, Agent, or Firm*—Lloyd M. Forster

[57] ABSTRACT

Quick change cutting tool block clamp wherein planar mounting faces of adapter base and tool holder faces are located and retained in compressive engagement through linear interengagement of transverse semi-dovetail key surfaces under pressure established by a spaced pivoted clamping dog mechanism spanning the engagement faces. Clamping retention is entirely accomplished by means immediately adjacent the interface of the planar surfaces leaving the outer surfaces of the tool holder open and free of clamp actuating projections.

8 Claims, 7 Drawing Figures

QUICK CHANGE TOOL BLOCK CLAMP

BACKGROUND OF THE INVENTION

Replaceable tool holders are well known in the art for use in cross slides, feedout heads, adapters for machines, machine slides and turrets.

Replaceable insert cartridges are frequently employed with the cartridge mounted on an adapter block such as used for feedout heads on cross slides, the base for the cartridge may be directly mounted on the cross slide or other tool but in some cases it may be desirable to provide quick change block tooling as where the insert cartridge is mounted on a quickly replaceable block. Prior art versions are commercially available and known in the art under the trade names "Sandvik MTS", Modco "Floating Wedge" Connection, Komet ABS, and Modco "H" lock as illustrated in available sales publications.

BRIEF SUMMARY OF THE PRESENT INVENTION

The present invention provides an interface between an adapter base for fixed attachment to a machine tool and a quick change tool holder block with locating and clamping means substantially confined to recesses immediately adjacent the planar interface leaving the top of the tool holder block open and free of any clamping protrusion or projection other than the cutting insert or cutting insert cartridge per se.

A transverse semi-dovetail key anchored in the base serves to locate the tool holder block longitudinally and produce compressive engagement of the interface surfaces in response to linear clamping force imparted to the tool holder block by a pivoted clamping dog projecting through the interface engaging a cross pin in the tool holder with a pressure angle producing both linear clamping force and direct compressive pressure at the interface substantially spaced from the cross key.

In the preferred embodiment, a lateral locating key is provided at the interface intermediate the cross key and pivoted clamp dog, and a screw accessible from the end of the adapter base adjacent the interface is adapted to actuate the pivoted clamp dog for clamping and release of the tool holder. In its loosened condition a spring may be provided to releasably urge the clamp dog into tool holder retaining position with sufficient retention force to permit handling and inversion of the quick change block assembly without falling apart.

In a preferred embodiment the pivoted clamp dog is provided with a ramp tail engageable by a wedge actuated by a differential screw providing superior mechanical advantage for exerting locking force on the pivoted clamp dog.

In one modification the clamp dog per se is provided with a close side fit in opposed matching slots at the interface to provide lateral location without a separate intermediate key.

DETAILED DESCRIPTION OF THE PREFERRED EMBODIMENT

Figure 1:
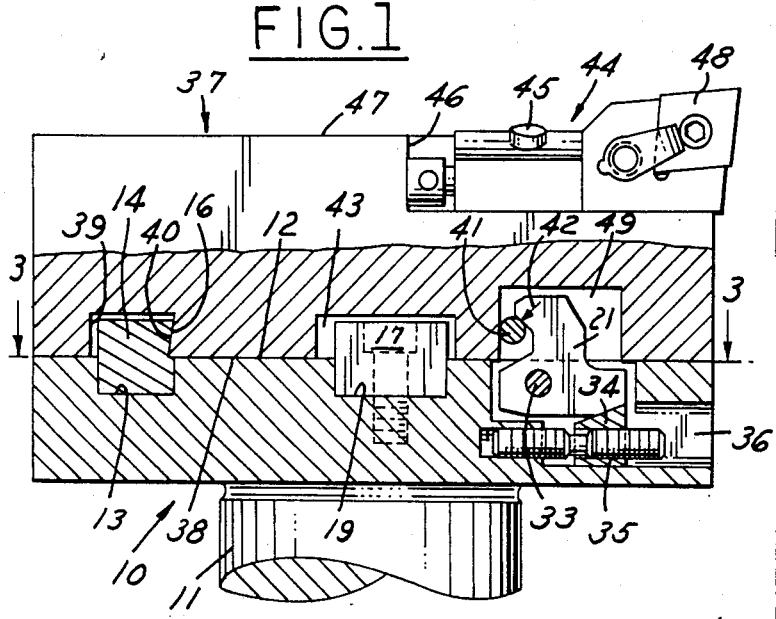
FIG. 1 is a partially sectioned side elevation of a preferred embodiment of the quick change block clamp assembly taken along the line 1—1 of FIG. 2.
Figure 2:
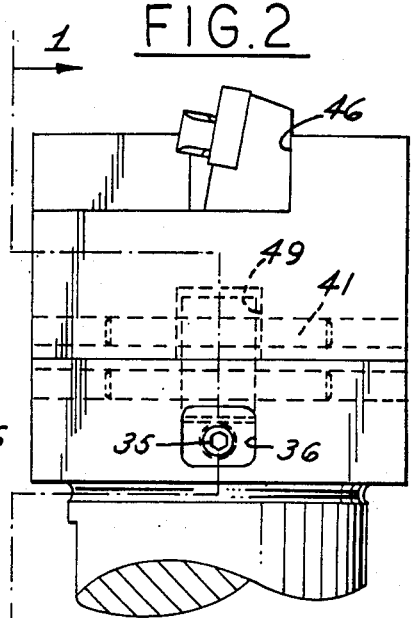
FIG. 2 is a end view of the assembly shown in FIG. 1.
Figure 3:
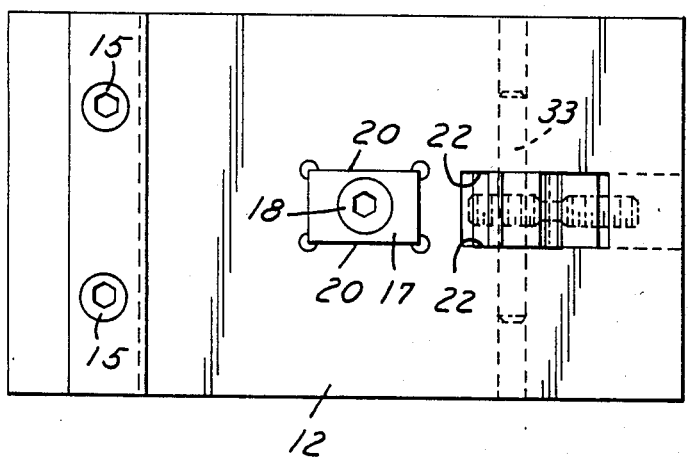
FIG. 3 is a sectional plan view taken along the line 3—3 of FIG. 1.

With reference to FIGS. 1-3 adapter base 10 is provided with integral shank 11 or any other suitable provision for fixed installation in a machine tool which may be for cross slide feedout head, machine slide, turret or similar installation. Planar tool holder mounting face 12 is provided with cross slot 13 for cross key 14 bolted at 15 and provided with semi-dovetail face 16. Transverse locating key 17 is bolted at 18 within recess 19 and provides lateral locating faces 20. Clamp dog 21 housed within recess 22 is pivotably pinned at 33 for actuation by wedge 34 fed by differential screw 35 accessible through access hole 36 for Allen wrench engagement.

Quick change cutting tool holder 37 is provided with matching face 38 engageable with mounting face 12 and cross slot 39 with matching semi-dovetail face 40 engageable with cross key face 16 providing longitudinal location and compressive mounting face engagement upon actuation of clamp dog 21 to engage cross pin 41 with a line of force 42 exerting longitudinal displacement force as well as mounting face pressure on holder 37. Slot 43 in holder 37 closely fits locating surfaces 20 of key 17 for accurate lateral location.

Holder 37 may be quickly installed and removed for replacement by a similar quick change block having any desired cutting tool installed thereon such as cartridge 44 bolted at 45 within corner recess 46 formed in upper face 47 and providing a mounting for conventional indexable insert 48.

Figure 4:
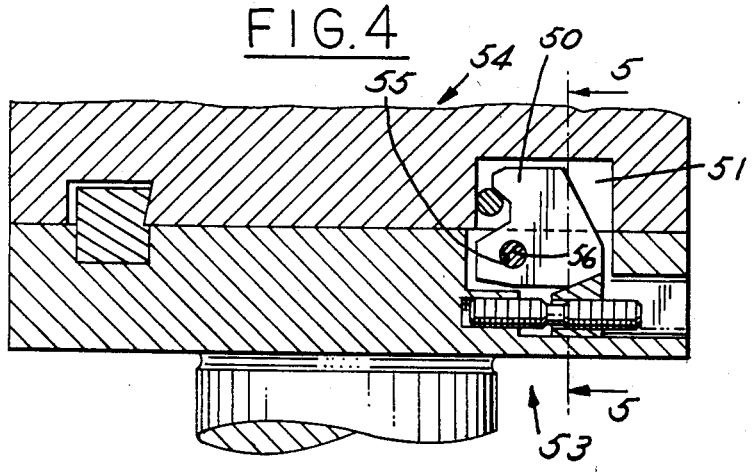
FIG. 4 is a view similar to FIG. 1 showing a modification eliminating an intermediate key.
Figure 5:
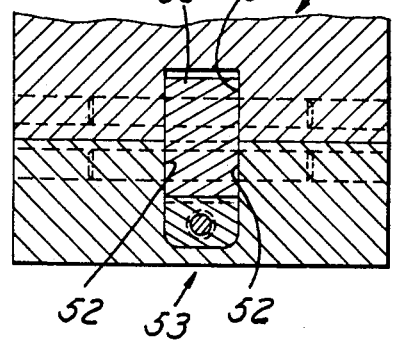
FIG. 5 is a sectional view taken along the line 5—5 of FIG. 4.

With key 17 serving to laterally locate holder 37, substantial clearance is provided in recess 49 as shown in FIG. 2. However, with reference to FIGS. 4 and 5 illustrating modified clamp dog 50, a reduced clearance in recess 51 as shown in FIG. 5 together with a close fit in side walls 52 in base 53 enable clamp dog 50 to serve in place of a stationary key to provide side location for holder 54. In this case adequate clearance in clamp dog hole 55 for pivot pin 56 is desirable to avoid binding through any tolerance inaccuracies.

Figure 6:
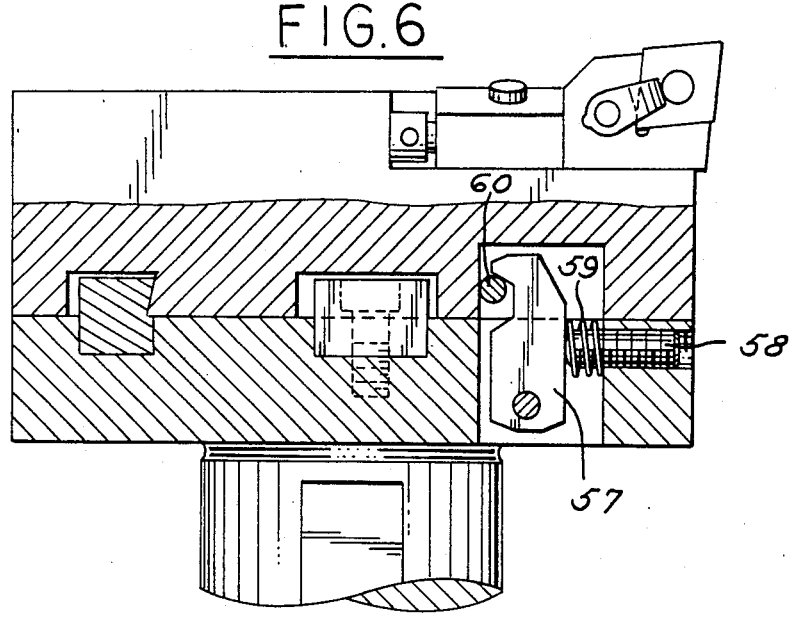
FIG. 6 is a view similar to FIG. 1 illustrating a modified form of pivoted clamp dog taken along the line 6—6 of FIG. 7.
Figure 7:
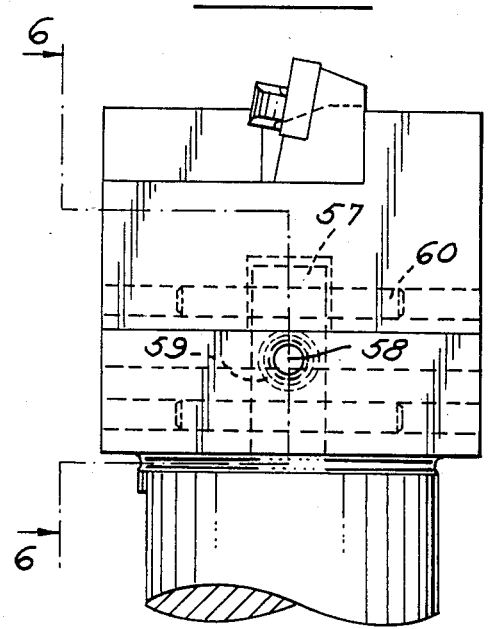
FIG. 7 is an end view of the block clamp assembly shown in FIG. 6.

With reference to FIGS. 6 and 7 the construction and operation of the unit is similar to FIG. 1 with the exception of modified form of clamp dog 57 actuated directly by locking screw 58. Compression spring 59 serves to retain clamp dog 57 in yieldable engagement with sufficient retention force to prevent disassembly during handling or during inversion of the unit while permitting manual disassembly by merely sliding the tool holder against the compression spring to free the dovetail engagement whereupon lifting of the tool holder will readily disengage clamp dog 57 from cross pin 60.

We claim:

1. Quick change tool block clamp comprising on adapter base for fixed attachment to a machine tool, a planar tool holder mounting face on said base, a quick change cutting tool holder having a matching face engageable with said mounting face, rigidly fixed interengaging transverse semi-dovetail locating surface means extending between said respective faces for producing compressive face engagement in response to relative linear face displacement, and means for producing said relative linear displacement together with additional compressive face engagement comprising a transverse axis pivotally anchored clamp dog in said adapter base extending through said respective faces linearly spaced from said locating surface means, a rigidly anchored cross pin in said tool holder releasably engageable by said clamp dog, and locking screw means seated in said adapter base for actuating said clamp dog.

2. Quick change tool block clamp of claim 1 wherein said locating surface means includes interengaging transverse semi-dovetail surfaces.

3. Quick change tool block clamp of claim 1 including compressive spring means for retaining said clamp dog in displaceable engagement when said clamp screw is backed off from locking engagement.

4. Quick change tool block clamp of claim 1 including screw actuated wedge means in aid adapter base for producing pivotal clamp engagement of said clamp dog.

5. Quick change tool block clamp of claim 1 including differential screw actuated wedge means in said adapter base for producing pivotal clamp engagement of said clamp dog.

6. Quick change tool block clamp of claim 1 including a rigidly mounted closely fitting key means projecting through said faces for accurately fixing the relative lateral location of said tool holder on said base.

7. Quick change tool block clamp of claim 1 including closely fitting side walls in said base and tool holder adjacent the sides of said clamp dog for establishing the relative lateral location of said tool holder on said base.

8. Quick change tool block clamp of claim 1 including a cartridge indexable insert holder mounted in a recessed exposed surface pocket on said tool holder.

* * * * *